No. 819,659. PATENTED MAY 1, 1906.
L. A. KEENE.
MANURE SPREADER.
APPLICATION FILED MAY 6, 1905.
2 SHEETS—SHEET 1.
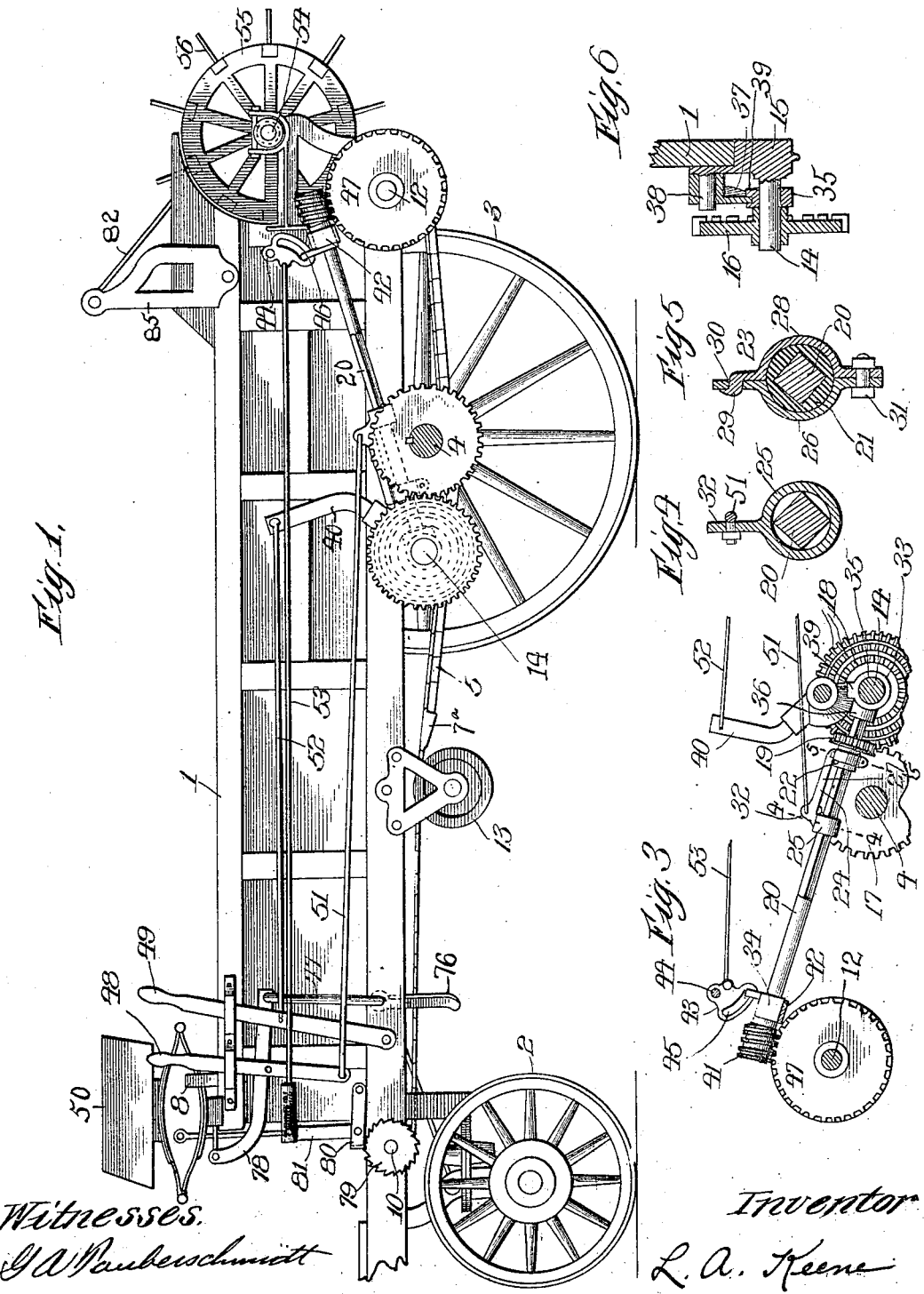

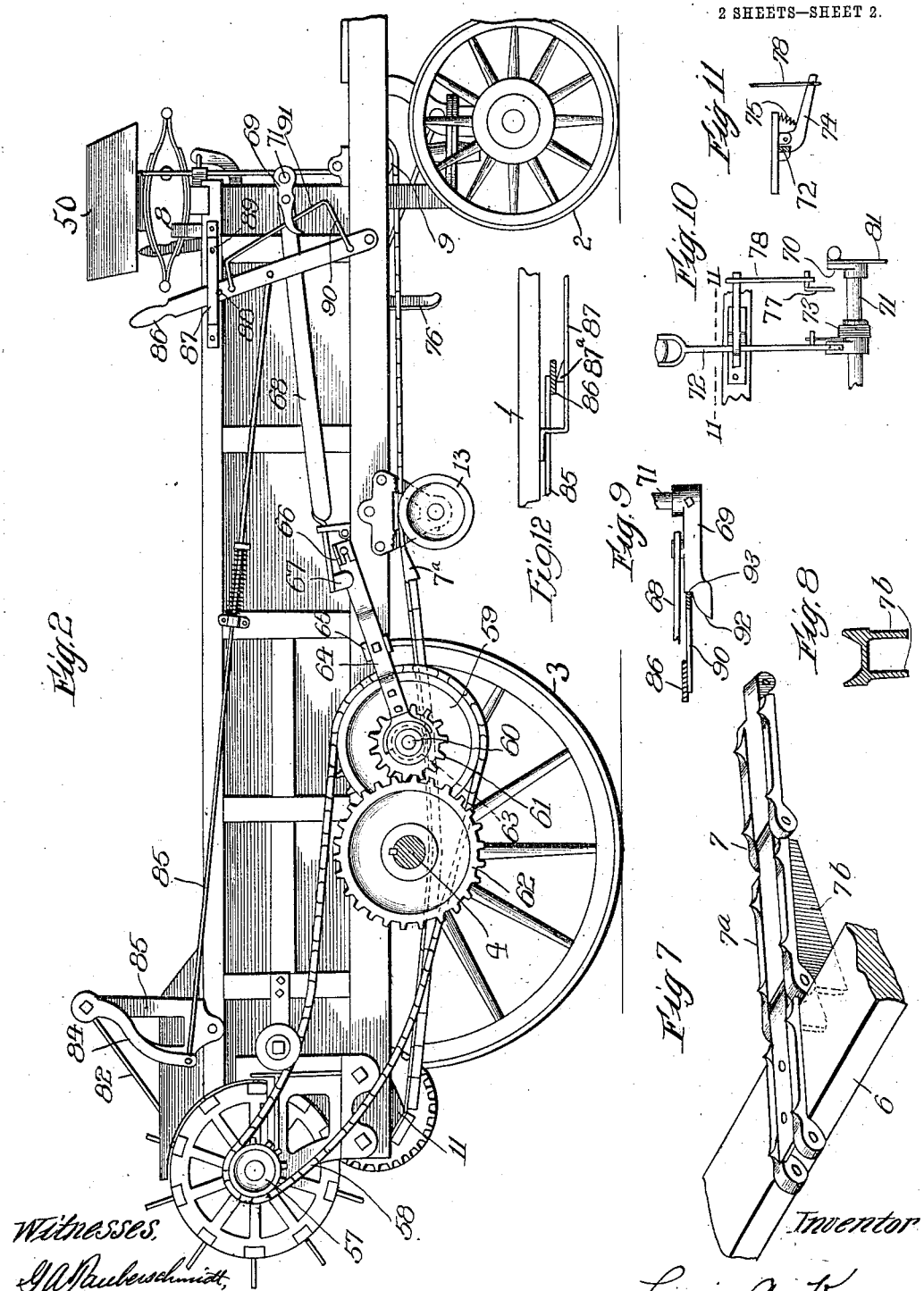

UNITED STATES PATENT OFFICE.

LOUIS A. KEENE, OF WATERMAN, ILLINOIS.

MANURE-SPREADER.

No. 819,659.  Specification of Letters Patent.  Patented May 1, 1906.

Application filed May 6, 1905. Serial No. 259,231.

*To all whom it may concern:*

Be it known that I, LOUIS A. KEENE, a citizen of the United States, residing at Waterman, in the county of Dekalb and State of Illinois, have invented certain new and useful Improvements in Manure-Spreaders, of which the following is a specification.

The object of this invention is the improvement of manure-spreaders in certain details to be pointed out hereinafter.

In the accompanying drawings, Figure 1 is a side elevation of a manure-spreader embodying the features of my invention, the near drive-wheel being removed. Fig. 2 is a similar view taken from the opposite side of the spreader. Fig. 3 is a detail view of the bottom-actuating mechanism. Fig. 4 is a sectional view taken on dotted line 4 4 of Fig. 3 on an enlarged scale. Fig. 5 is a section on dotted line 5 5 of Fig. 3, also on an enlarged scale. Fig. 6 is a detail view of a portion of the bottom-actuating mechanism. Fig. 7 is a perspective view of several of the links of the drive-chain for the movable bottom. Fig. 8 is a transverse sectional view through one of said links. Fig. 9 is a view of an operating connection between the rake and the mechanism for rotating the spreader-cylinder and feeding the bottom. Fig. 10 is a detail view showing in front elevation the hand-lever for starting and stopping the machine and the means for locking said lever in the operative position. Fig. 11 is a horizontal section on dotted line 11 11 of Fig. 10. Fig. 12 is a top plan view of a part of the rake-operating devices.

In the construction of a manure-spreader embodying my invention I provide a box or body 1, suitably mounted upon the forward wheels 2 and the rear or drive wheels 3, said rear wheels being loosely mounted upon a rotative shaft 4, suitably supported beneath the spreader-body. Each of said rear wheels is connected to said shaft by means of a pawl and ratchet, (not shown,) whereby forward movement of the spreader is transmitted through the wheels to rotate said shaft, while backward movement of the spreader causes the pawls to click over their ratchets.

The bottom 5 of the box 1 is adapted and mounted to travel to feed the manure to the distributing mechanism, said bottom being made up of a plurality of transverse slats 6, secured to side chains (not shown) and to an endless driving-chain 7, extending beneath the longitudinal center of the bottom. At the forward end of the bottom 5 is fixed an upright end board or follower 8. The forward portion of the chain 7 is carried upon a sprocket-wheel 9, fixed upon a shaft 10, which shaft is rotatably mounted in bearings (not shown) at the forward end of the spreader-body. The rear portion of said chain runs over a sprocket-wheel 11, rigidly mounted upon a shaft 12, said shaft being rotatably mounted in suitable bearings at the rear end of the body. An idler-roller 13, supported beneath the spreader-box, carries the portion of the chain 7 which extends beneath said box. In order to avoid shock and strain to the bottom 5 in rising over said idler-roller, the link 7$^a$, next adjacent to the rearmost slat of said bottom, is provided upon its under side with two wings 7$^b$, inclined downwardly from the forward end of said link and of a height at their rear ends substantially corresponding with the thickness of the slats 6. When the bottom is fed rearward and the rearmost slat 6 of said bottom approaches the idler-roller 13, the link 7$^a$ rides up over said roller, its wings 7$^b$ raising the adjacent slat 6 up onto said roller, thus avoiding the shock which would be experienced if the edge of said slat were brought into contact with the roller.

The bottom 5 is fed rearward in the spreader-box 1 during the spreading operation by means of mechanism to be next described.

Upon a stub-shaft 14, rigidly mounted upon the spreader-box 1 by means of the bracket 15, is rotatably mounted a spur-gear 16, meshing with a similar gear 17, fixed upon the shaft 4. The inner face of said spur-gear 16 is provided with several gear-rings 18 of differing diameters, the teeth of which rings are adapted to mesh with a pinion 19, slidably mounted upon the squared portion of a shaft 20. The hub 21 of the pinion 19 has a peripheral groove 22 for the reception of the loop 23 of a yoke 24, said yoke comprising another loop 25, loosely embracing the shaft 20. The loop 23 is separable, being made up of a semicircular portion 26, formed integral with the cross-bar 27 of the yoke, and a detachable semicircular portion 28, adapted to be connected at one end with the portion 26 by means of a hook 29, adapted to enter an opening 30 in said portion 26 and to be connected at its other end with said portion 26 by means of a bolt 31. A perforated ear 32 on the cross-bar 27 affords means for attaching an operating-rod to said yoke for sliding the pinion 19 longitudinally of its shaft. Two bearing-brackets 33 and 34 rotatably support the shaft 20, the former bracket being slidably mounted upon the stub-shaft 14 by means of its sleeve portion 35 and having a bearing-socket 36 for the forward end of said shaft 20. The bracket 33 is moved longitudinally of the stub-shaft 14 by means of an oscillatory cam-wing 37, pivotally mounted upon the side of the spreader-box by means of the pivot 38, the outer edge of said cam-wing lying between two ears 39, formed upon the upper side of the sleeve portion 35 of the bearing-bracket 33. The cam-wing 33 is oscillated by means of an operating-arm 40, fixed with relation to said cam-wing. Upon the rear end of the shaft 20 is fixed a worm 41, and the bearing 34 for this end of the shaft is vertically movable within a guide-bracket 42, secured to the side of the spreader-box, in order that said worm may be withdrawn from engagement with the teeth of its worm-wheel. Such vertical movement is given to the bearing 34 by means of a sector 43, rotatably mounted upon a stud 44, projecting from the side of the spreader-box, said sector having a cam-slot 45, within which a finger 46, fixed with relation to said bearing 34, extends. The worm 41 is adapted to engage a worm-wheel 47, fixed upon one end of the bottom-supporting shaft. Shifting-levers 48 and 49 are pivotally mounted upon the side of the spreader-box 1 within convenient reach of the driver's seat 50 and are respectively connected with the ear 32 on the yoke 24 and the arm 40 of the cam-wing 37 by means of connecting-rods 51 and 52. A connecting-rod 53 connects the sector 43 with a crank-arm of the starting and stopping mechanism, to be later herein described.

Upon a shaft 54, rotatably mounted in suitable bearings at the rear end of the spreader-body, is fixed a beater-cylinder 55, having radially-projecting teeth 56. The shaft 54 has fixed upon one of its ends a sprocket-wheel 57 for receiving a drive-chain 58, said chain also running over a sprocket-wheel 59, fixed upon a shaft 60. The shaft 60 is rotatably supported forward of the shaft 4 in suitable bearings (not shown) and is arranged to be operatively connected with said shaft 4 by means of a spur-pinion 61, loosely mounted on the shaft 60 and meshing with a spur-gear 62, fixed upon the shaft 4. Upon the adjacent faces of the hubs of the sprocket-wheel 59 and the spur-pinion 61 are formed clutch-teeth (not shown) adapted to intermesh. The opposite side of the hub of said spur-pinion is peripherally grooved, as at 63, to receive the forked rear end of a shifting-lever 64, pivotally mounted intermediate its ends upon a bracket 65, fixed to the side of the spreader-box, the forward end of which shifting-lever 64 is provided with two oppositely-extending cam-wings 66, adapted to lie between the fingers 67 of a longitudinally-slidable rod 68. The forward end of the shifting rod 68 and the forward end of the connecting-rod 53 are pivotally connected with crank-arms 69 and 70, respectively, upon a shaft 71, rotatably mounted in suitable bearings upon the forward end of the spreader-body. A hand lever 72 is fixed upon the shaft 71 for rocking said shaft to throw the beater 55 and bottom 5 into and out of action. A coiled spring 73, fixed at one end to said shaft and bearing at its other end against the forward end of the spreader-box or any other fixed point, tends to rock said shaft in the direction to throw the beater and bottom out of operation. The shaft 71 is held in its operative position by means of a detent-arm 74, adapted to engage the hand-lever 72 when the latter is moved into its upright or working position, said detent-arm being held forward in position to engage said lever by means of a coiled spring 75, extending between said arm and the box 1. The detent arm 74 is automatically rocked to release the shaft 71 to the action of its spring 73 by means of a releasing-lever 76, pivotally mounted beneath the spreader-box in the path of the rear end of the bottom 5, said lever 76 being connected with the detent-arm 74 by means of an arm 77 and a link 78. When the rear slat 6 of the bottom 5 strikes the releasing-arm 76, the detent-arm 74 is withdrawn from engagement with the lever 72, whereupon the spring 73 throws the bottom-actuating mechanism and the beater-actuating mechanism out of operation.

Mechanism (not illustrated herein in detail) is provided for restoring the bottom 5 to its normal position in the spreader-box 1. In order to hold said bottom in such normal position while the box 1 is being filled with manure and the spreader is being moved to the point where the manure is to be distributed, a ratchet-wheel 79 and a pawl 80 are provided, said ratchet-wheel being fixed upon one end of the shaft 10. The pawl 80 is pivotally mounted upon the side of the spreader-body and is pivotally connected with the crank-arm 70 upon the shaft 71 by means of a link 81. When the shaft 71 is rocked by an upward movement of the hand-lever 72 to throw the bottom and the beater into action, the pawl 80 is withdrawn from engagement with the ratchet-wheel 79; but when said shaft is moved by the spring 73 to throw the bottom and the beater out of action the pawl 80 engages said ratchet-wheel and locks the bottom against rearward movement.

A rake 82 is pivotally mounted in proper relation to the beater-cylinder 55 in bearing-brackets 83, carried by the spreader-box. An arm 84, fixed with relation to the rake, provides means for swinging said rake toward and away from the spreader-cylinder.

The outer end of said arm 84 is pivotally connected with the rear end of a connecting-rod 85, which rod is pivotally connected at its forward end to an operating-lever 86, pivotally mounted upon the side of the spreader-box. The lever 86 is movable within the limits of a loop 87, mounted upon the spreader-box, and is provided with a fixed pin 88, projecting outwardly from said lever and adapted to enter an opening 89 in said loop to hold the lever at the forward extremity of its movement. The lever 86 has a forward projection 90, said projection in this instance being a standing loop having a front bar 91. The outer end of the crank-arm 69, hereinbefore referred to, has an inclined cam-surface 92, adapted to engage said bar 91 and press said lever 86 inward to withdraw the pin 88 from its locking-opening 89, and said crank-arm also has a shoulder 93, adapted to engage said bar 91 and force said lever rearwardly to throw the rake 82 into its operative position. It will thus be seen that the arm 69 moves the rake 82 into its operative position simultaneously with the placing in action of the beater 55.

87$^a$ is a locking projection on the inner side of the loop 87, adapted to engage the hand-lever 86 and hold it in its rearward position.

In use the beater-rotating mechanism and the bottom-feeding mechanism are thrown into operation by raising the hand-lever 72 into its upright position, such movement of the lever 72 rocking the shaft 71, moving the worm 41 into mesh with its worm-wheel 47 and clutching the sprocket-wheel 59 and the pinion 61 together, thus rotating the spreader-cylinder 55 and feeding the bottom 5 rearward in the spreader-box. The rocking of the shaft 71 also causes the rake 82 to be swung into its operative position by reason of the engagement of the arm 69 with the projection 90 upon the lever 86. As the follower-board 8 moves rearward in the spreader-box the rearmost portion of the bottom 5 moves forward beneath the box 1. In order to avoid strain when the rearmost slat 6 of the bottom 5 is pulled over the idler-roller 13, I insert in the drive-chain 7 for said bottom the special link 7$^a$, hereinbefore described, by means of the wings 7$^b$, upon which link the approaching slat is lifted up onto said roller. When it is desirable to change the rate of bottom travel with relation to the rotative speed of the spreader-cylinder, the lever 49 is moved to withdraw the pinion 19 from engagement with the spur-gear 16, the lever 48 moved to shift said pinion longitudinally upon its shaft 20 into coincidence with a gear-ring 18, calculated to produce the desired speed, and the lever 49 again moved to throw the pinion 19 into engagement with such gear-ring. Being supported at two points upon the shaft 20, the yoke 24 has no tendency under the action of the lever 48 to tilt the pinion 19, and thereby cause it to bind upon its shaft.

I claim as my invention—

1. In a manure-spreader, in combination, a distributing mechanism; and a feeding mechanism comprising a gear-wheel having a plurality of gear-rings, a pinion adapted to mesh with any of said gear-rings and having a hub, a shaft on which said pinion is slidably mounted, a yoke comprising two widespread arms, one of which arms has an engagement with the hub of said pinion, the other arm being slidably mounted on said shaft at a distance from said pinion-hub, and means connected with said yoke for sliding said yoke and said pinion longitudinally of said shaft.

2. In a manure-spreader, in combination, a distributing mechanism; and a feeding mechanism comprising a gear-wheel having a plurality of gear-rings, a pinion adapted to mesh with any of said gear-rings, a shaft on which said pinion is slidably mounted, said pinion being provided with a hub having a peripheral groove therein, a yoke comprising two loops, one of said loops being loosely mounted on said shaft and the other loop being separable and lying in the groove in the hub of said pinion, and means connected with said yoke for sliding said yoke and said pinion longitudinally of said shaft.

3. In a manure-spreader, in combination, a distributing mechanism; and a feeding mechanism comprising a movable bottom, a drive-chain attached to said bottom, an idler-roller for supporting a portion of said chain and said bottom, said bottom comprising slats each attached to a link of said drive-chain, which slats during the travel of said bottom assume a position below said links when approaching said idler-roller, and an inclined portion on the under side of the link adjacent to the end of said bottom, said inclined portion being of a height substantially equal to the thickness of said slats.

4. In a manure-spreader, in combination, a distributing mechanism; and a feeding mechanism comprising a movable bottom, a drive-chain attached to one side of said bottom, and an idler-roller for supporting said chain and said bottom at one point, one of the links of said chain adjacent to one end of said bottom having an inclined portion of a height substantially equal to the thickness of said bottom.

5. In a manure-spreader, in combination, a distributing mechanism; and a feeding mechanism comprising a movable bottom, a drive-chain attached to one side of said bottom, an idler-roller for supporting said chain and said bottom at one point, the link of said chain adjacent to one end of said bottom having on the same side as the bottom two inclined wings, the higher ends of said wings being adjacent to the end of the bottom and being of a height substantially equal to the thickness of said bottom.

6. In a manure-spreader, in combination, a distributing mechanism; a pivotally-mounted rake adapted to coöperate with said distributing mechanism; a pivoted lever for moving said rake upon its pivot; means for locking said lever to hold said rake in the inoperative position; and means for throwing said distributing mechanism into and out of operation, said means comprising a rotatable shaft, and means moving with said shaft for releasing said locking means and moving said lever upon its pivot.

7. In a manure-spreader, in combination, a beater-cylinder; a member adapted to be moved into and out of operative position with reference to said cylinder; a lever for moving said member; means for locking said lever to hold said member in an inoperative position; and means for placing said beater-cylinder in operation, said means comprising a rotatable shaft and means connected and moving with said shaft for releasing said locking means and moving said lever upon its pivot.

8. In a manure-spreader, in combination, a distrbuting mechanism; a member adapted to be moved into and out of operative position; a lever for moving said member; a fixed member having a locking-opening therein; a locking-pin on said lever adapted to enter said opening; and means for placing said distributing mechanism in operation, said means comprising a rotatable shaft, and means moving with said shaft for moving said lever to withdraw said pin from its locking-opening and for moving said lever to shift said first-mentioned member.

9. In a manure-spreader, in combination, a distributing mechanism; a rake adapted to be moved into and out of operative position; a pivoted lever for moving said rake; a fixed member having a locking-opening therein; a locking-pin on said lever adapted to enter said opening; and means for placing said distributing mechanism in operation, said means comprising a rotatable shaft, and an arm fixed on said shaft, said arm having a cam portion adapted to engage said lever and move it to withdraw said pin from its locking-opening, said arm also having a shoulder adapted to engage said lever for pivotally moving said lever to move said rake.

LOUIS A. KEENE.

Witnesses:
M. M. DALEY,
L. L. MILLER.